United States Patent [19]

Ishihara

[11] Patent Number: 4,775,717
[45] Date of Patent: Oct. 4, 1988

[54] PROCESS OF MIXING MELTS OF AMORPHOUS POLYESTER AND A GRAFT MODIFIED POLYSTYRENE AND COMPOSITION THEREOF

[75] Inventor: Toshio Ishihara, Oyadai, Japan

[73] Assignee: General Electric Company, Mt. Vernon, Ind.

[21] Appl. No.: 113,098

[22] Filed: Oct. 26, 1987

[51] Int. Cl.$^4$ ............................................ C08L 69/00
[52] U.S. Cl. ...................................... 525/67; 525/64; 525/68; 525/69
[58] Field of Search ................ 525/67, 68, 64, 285, 525/301, 69

[56] References Cited

U.S. PATENT DOCUMENTS 3,862,098  1/1975  Milkovich et al. ............. 525/285

FOREIGN PATENT DOCUMENTS 085115  8/1982  European Pat. Off.

Primary Examiner—Theodore E. Pertilla
Attorney, Agent, or Firm—Martin B. Barancik

[57] ABSTRACT

A process which comprises mixing a melt of an amorphous polyester with a melt of a graft modified polystyrene polymer.

20 Claims, No Drawings

PROCESS OF MIXING MELTS OF AMORPHOUS POLYESTER AND A GRAFT MODIFIED POLYSTYRENE AND COMPOSITION THEREOF

BACKGROUND OF THE INVENTION

Amorphous aromatic polyesters are well known in the polymeric art. They are generally characterized by the repeating unit carboxy ester

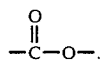

Aromatic polyesters are of particular importance and have many useful applications. Examples of aromatic amorphous polyesters for this invention include polycarbonates, copolyestercarbonates, polyarylates and polycycloalkylene phthalates.

Generally speaking aromatic polycarbonate resins offer a high resistance to the attack of mineral acids, may be easily molded, are physiologically harmless as well as strain resistant. It is also well known that polycarbonate resins have high impact strength below a critical thickness of between about ⅛ and ¼ inch. Additionally polycarbonates are transparent and process at relatively high temperatures with the appropriate melt viscosities.

Copolyestercarbonates are generally quite similar to polycarbonate in properties but generally have a higher secondary transition temperature (Tg) than the comparable polycarbonates. Polyarylates are generally quite similar to the copolyestercarbonates in properties but have a still higher secondary transition temperature than the copolyestercarbonates.

The uses and properties of the polycycloalkylene phthalates are well known. Common to all these amorphous aromatic polyesters are the relatively high DTUL, Distortion Temperature Under Load, as measured at a certain psig and their relatively low tensile elongation. This is also generally true with respect to blends of these amorphous polymers with polystyrenes. The presence of the polystyrene in the blends seems to bring about a relatively low tensile elongation which progressively becomes lower as increasing polystyrene is present as well as a lowering of the DTUL, a measurement of the flexural stiffness and toughness of the polymer at a specific temperature. Once more this measurement of stiffness is lowered as the quantity of polystyrene increases in the admixture.

It has now been discovered that the addition of a graft modified polystyrene instead of a normal polystyrene tends to substantially increase the DTUL values of the polymer blends while greatly increasing the tensile elongation, particularly with the polycarbonate. Additionally it is noted that with substantially large quantities of graft modified polystyrene, the clarity of the blend is substantially higher than with the normal polystyrene molecule. Although the structure(s) of the composition is not known with certainty it is believed that ester interchange occurs to some extent between the graft modified polystyrene and the amorphous aromatic polyester, thereby forming a new molecule. It is also believed that present in the new composition is an intimate admixture of the two components.

SUMMARY OF THE INVENTION

In accordance with the invention there is a process which comprises mixing a melt of an amorphous aromatic polyester with a melt of a graft modified polystyrene which is not a block copolymer.

A further aspect of the invention is a composition prepared from the above process.

Another aspect of the invention is a composition comprising the admixture of an amorphous aromatic polyester and a graft modified polystyrene which is not a block copolymer.

DETAILED DESCRIPTION OF THE INVENTION.

The amorphous aromatic polyesters suitable for this invention include the polycarbonates, copolyestercarbonates, polyarylates and polycycloalkylene phthalates. The aromatic polycarbonate resins suitable for use herein as component (a) may be prepared by reacting a dihydric phenol with a carbonate precursor, such as phosgene, a haloformate or a carbonate ester. Typically, such carbonate polymers are represented as comprising recurring structural units of the formula:

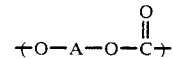

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.70 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:
2,2-bis-(4-hydroxyphenyl)propane;
hydroquinone;
resorcinol;
2,2-bis-(4-hydroxyphenyl)pentane;
biphenol
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxyphenyl)sulfone;
bis-(3,5-dimethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4'4'-dihydroxydiphenyl ether;
4,4'-dihydroxy-3,3'-dichlorodiphenyl ether;
4,4'-dihydroxy-2,5-dihydroxydiphenyl ether;
and the like.

Other dihydric phenols which are also suitable for use in the preparation of the above polycarbonates are disclosed in U.S. Pat. Nos. 2,999,835; 3,038,365; 3,334,154 and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and U.S. Pat. Nos. 4,018,750 and 4,123,426, or by transesterification processes such as are disclosed in U.S. Pat. No. 3,153,008, as well as other processes known to those skilled in the art.

It is possible to employ two or more different dihydric phenols or a copolymer of a dihydric phenol with a glycol or with a hydroxy- or acid-terminated polyester or with dibasic acids in the event a carbonate copolymer or interpolymer rather than a homopolymer is desired for use in the preparation of the polycarbonate mixtures of the invention. Branched polycarbonates are also useful, such as are described in U.S. Pat. No. 4,001,184. Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use as component (a) herein is a homopolymer derived from 2,2-bis(4-hydroxyphenyl)propane (bisphenol-A).

The aromatic copolyestercarbonates which can be employed in this invention include those aromatic polymers with ester and carbonate repeating units as those found in U.S. Pat. Nos. 3,169,121; 4,287,787; 4,156,069; 4,260,731 and the like, each incorporated by reference. Of the aforementioned polymers, the polymers utilizing bisphenol-A as the dihydric phenol are preferred. Methods for preparing the polymers are well known and are described in the references cited above.

Polyarylates are polymers having all ester bonds. They are generally prepared from dihydric phenols and phthalic acids although any aromatic diacid or diphenol can be employed. These polymers and their methods of preparation are well known and are available commercially, for example under the tradename ARDEL from AMOCO. The dihydric phenol preferably employed is bisphenol-A and the aromatic diacid is terephthalic, isophthalic or a combination of the two.

The polycycloalkylene phthalates are typically the cis or trans 1,4-cyclohexane dimethanol based molecules wherein the diacids are terephthalic, isophthalic or a mixture thereof. Such polymers are available from Eastman Chemical under such tradenames as KODAR A150 (trans 1,4-cyclohexane dimethanol with 50:50 isophthalic and terephthalic acids as well as PCTG (1,4-cyclohexane dimethanol, terephthalic acid and ethylene glycol). Generally linear diols may be employed up to about 50 mole percent of the diol units or up until the point that the polymer still remains amorphous. Examples of such diols include diols of two to ten carbon atoms such as ethylene glycol, butane 1,4-diol and the like.

The polystyrenes employed are those polymers wherein there is a vinyl aromatic unit therein. Examples of vinyl aromatic units are styrene, paramethyl styrene, alphamethyl styrene, naphthalene and other aryl containing vinyl aromatic monomers. Styrene, per se, is preferred. The polystyrene need not be made up of all vinyl aromatic units but may be combined with monomers which can be combined into the polymer by polymerization initiated by a radical transfer mechanism. Such monomers include acrylonitrile, methacrylate, alkydienes such as butadiene and isoprene, and other like moieties. Examples of polystyrenes useful in the invention include polystyrene per se, polyalphamethyl styrene, polyparamethylstyrene, acrylonitrile styrene, methacryloyl styrene, butadiene styrene selectively hydrogenated or not, and other similar molecules. When there is other than a vinyl aromatic monomers present in the polymer there is from about 20 to about 90 mole percent of the polymer being the vinyl aromatic, preferably 50% mole percent or more of the molecule is the vinyl aromatic unit. The weight average molecular weight of the polystyrene can vary from about 20,000 to about 200,000.

The graft modified polystyrene polymers are prepared by polymerization methods which are well known in the art. A preferred method of preparation is through a radical grafting reaction. The graft modification of this polymer is performed by reacting the polymer with an unsaturated dicarboxylic acid or dicarboxylic acid anhydride. These agents include such materials as maleic acid, fumaric acid, itaconic acid the anhydrides thereof.

The grafting agent as previously mentioned is an unsaturated dicarboxylic acid or acid anhydride. Generally these acids or acid anhydrides are of the group consisting of

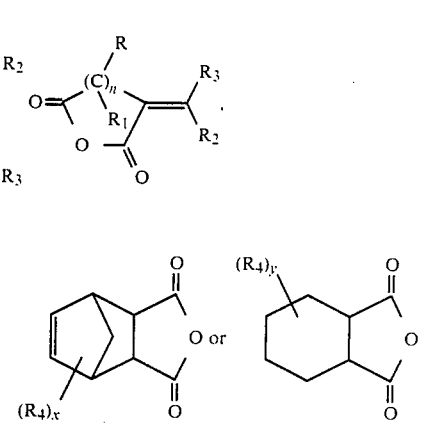

or the dicarboxylic acid analogues thereof wherein

R is the same or different as $R_1$ and is alkyl of one to six carbon atoms, inclusive, or hydrogen;

$R_2$ and $R_3$ are the same or different and are hydrogen, alkyl of one to six carbon atoms, inclusive, phenyl, chloro or bromo; and n is 0, 1 or 2.

$R_4$=H, alkyl of one to six carbon atoms, aryl, alkyl, phenyl, Br, Cl, X=0 to 7, preferably 0, 1 or 2, y=0 to 6.

The preferred alkyl groups have no more than three carbon atoms. R and $R_1$ are each preferably hydrogen and n is preferably zero or 1, x and y are preferably 0 or 1.

The preparation of the graft modified polystyrene is very readily done. Starting with a polystyrene, an unsaturated dicarboxylic acid or acid anhydride as typified by maleic anhydride is added to the copolymer, preferably with a free radical initiator of the peroxy type. The reaction occurs in the melt, for example, in an extruder. Generally the quantity of the maleic anhydride, anhydride, typifying the grafting agent, is from about 0.01 to about 5.0 weight percent of the polystyrene, preferably 0.1 to 1.0 weight percent.

The concentration of the radical initiator used to prepare the modified polymer may vary between wide limits and is determined by the desired degree of functionality and degradation allowable. Typical concentrations range from about 0.001 to about 5.0 weight percent, more preferably between about 0.01 and 1.0 weight percent.

The graft modified polystyrene is utilized in quantities sufficient to upgrade the DTUL and tensile elongation properties of the amorphous polyester graft modified polystyrene blend compared to a blend prepared from a normal polystyrene at the same concentrations. The range of compatibility and desirable results for the compositions of the invention can be obtained over a wide range of weight percent of materials. Generally from about 20 weight percent amorphous ester to about 98 weight percent amorphous ester and about 2 percent to 80 percent graft modified polystyrene can accomplish these results. The weight percents are calculated on the total of an amorphous polyester and grafted polystyrene being 100 weight percent.

As previously mentioned, the grafted polystyrene and amorphous polyester are mixed, generally under dry blend conditions and then coextruded together to form the composition of the invention. Extrusion temperatures employed are those which make the composition thermoplastic. These temperatures can vary depending upon the intrinsic viscosity of the particular polymers present and there weight percentages in the dry blend. Generally speaking temperatures from about 230 to about 300° C. can be used depending upon the above parameters. Molding conditions to form a shaped article are those sufficient to make thermoplastic the composition for purposes of shaping in the mold, for example molding temperatures of from about 250 to about 300° C. will most likely be satisfactory.

The following examples are presented to more fully and clearly illustrate the invention. Although the examples set forth are the best method presently known of practicing the invention, they are intended to be and should be considered as illustrative rather than limiting the invention. In the example all parts and percentages are by weight unless otherwise specified.

EXAMPLES

In the experiments below all samples were extruded at 500° F. with a single screw extruder (Sterling 1¾″) and molded at 570° F. to about 550° F. with a Van Dorn injection molding machine (75 tons). The grafted polystyrene (psg MAH) was prepared from polystyrene (PS) (Huntsman 203) at 98 weight percent and maleic anhydride at 2 weight percent. These two materials were dry blended and extruded at 550° F. from a single screw sterling extruder (1¾ in). The non-grafted polystyrene used in the examples was the same polystyrene obtained as Huntsman 203 but without grafting. The polycarbonate employed was bisphenol-A polycarbonate with an intrinsic viscosity of from about 0.55 to 0.58 dl/g as measured in methylene chloride at 25° C.

In each example at the weight percent shown below in the Table, the polycarbonate and the polystyrene grafted or non-grafted were dry blended together, extruded and the extrudate molded at the temperatures given above.

The properties shown in the Tables below are measured in the following manner:

| | |
|---|---|
| Tensile strength: | ASTM D638. |
| Tensile Elongation: | ASTM D638. |

| | |
|---|---|
| Flexural strength: | Flexural modulus: ASTM D790. |
| DTUL @ 264 psi: | ASTM D648. |
| Impact testing: | |
| Notched Izod: | |
| Un-notched Izod: | all by ASTM D256 |
| Double gate Izod: | |
| % Transmittance and % haze: | ASTM D1003. |

The measurement of the melt viscosity was made by using the Kasha Index (KI) which is done in the following manner:

The procedure for determining the Kasha Index is as follows: 7 grams of resin pellets, dried a minimum of 90 minutes at 125° C. are added to a modified Tinius-Olsen model T3 melt indexer; the temperature in the indexer is maintained at 300° C. and the resin is heated at this temperature for 6 minutes; after 6 minutes the resin is forced through a 1.05 mm radius orifice using a plunger of radius 4.7 mm and an applied force of 7.7 kgs. The time required for the plunger to travel 5.1 cm is measured in centiseconds; this is reported as the KI. The higher the KI, the higher the melt viscosity and the more viscous the resin, and the harder or more difficult the processability.

Below are the test results:

TABLE I

THE PROPERTIES OF PC/PS-g-MAH BLENDS

| | EXAMPLE | | | | | |
|---|---|---|---|---|---|---|
| | 1 | A | 2 | B | 3 | C |
| LEXAN ® 135 | 50 | 50 | 90 | 90 | 95 | 95 |
| PS | — | 50 | — | 10 | — | 5 |
| PS-g-MAH | 50 | — | 10 | — | 5 | — |
| Tens. Str (Y; psi) | 9300 | — | 9400 | 8900 | 9200 | 8900 |
| Tens. Str (B; psi) | 6500 | 9620 | 9300 | 6200 | 12400 | 10000 |
| Tens. Elong % | 53 | 4 | 86 | 26 | 99 | 75 |
| Flex. Str. (Y; Kpsi) | 14.1 | 15.1 | 14.1 | 13.8 | 13.9 | 13.9 |
| Flex. Mod. (Kpsi) | 344 | 412 | 348 | 346 | 337 | 339 |
| DTUL (@264 psi, °C.) | 134 | 102 | 131 | 127 | 136 | 130 |
| ⅛″ N. Izod (ft-lb/in) | 9.2 | 0.5 | 6.6 | 9.9 | 17 | 12 |
| ⅛″ Un. Izod (ft-lb/in) | >80 | 2.8 | >80 | — | >80 | >80 |
| ¼″ N. Izod (ft-lb/in) | 1.6 | 0.3 | 1.5 | 1.7 | 2.0 | 1.6 |
| DG Izod (ft-lb/in) | 1.8 | 0.3 | 1.4 | 1.3 | 3.8 | 9.4 |
| KI (6 min) csec | 7300 | 490 | 5900 | 4300 | 7800 | 4700 |
| (12 min) csec | 5900 | 510 | 5700 | 4400 | 7100 | 4400 |
| % Transmittance | 88.2 | 87.7 | 88.1 | 87.8 | 89.2 | 88.6 |
| % Haze | 3.9 | 50.3 | 4.8 | 2.7 | 1.8 | 1.5 |

As shown in the data of the Table, the grafted polystyrene containing examples performed substantially better with respect to increasing DTUL and tensile elongation, particularly as increasing quantities of polystyrene are present in the compositions in comparison with the non-grafted polystyrene. This is also the case with respect to the clarity of the composition when increasing quantities of polystyrene are present.

What is claimed is:

1. A process which comprises mixing a melt of an amorphous polyester selected from the group consisting of an aromatic polycarbonate, aromatic copolyestercarbonate, polyarylate and polycycloalkylene phthalate with a melt of a graft modified polystyrene polymer which is not a block copolymer, wherein the graft modifying agent is an unsaturated dicarboxylic acid or an unsaturated dicarboxylic acid anhydride.

2. A process in accordance with claim 1 wherein polycarbonate is present.

3. A process in accordance with claim 1 wherein the monomer in the polystyrene polymer is styrene, α-methylstyrene or p-methylstyrene.

4. A process in accordance with claim 3 wherein a non-styrenic comonomer is present.

5. A process in accordance with claim 4 wherein the styrenic monomer is 20–90 mole percent of the polystyrene.

6. A process in accordance with claim 5 wherein the non-styrenic monomer is acrylonitrile, methacrylate or an alkadiene.

7. A process in accordance with claim 6 wherein the styrenic monomer is more than or equal to 50 mole percent.

8. A process in accordance with claim 1 wherein the graft modifying agent is fumaric acid or maleic anhydride.

9. A process in accordance with claim 2 wherein the polystyrene polymer is made from styrene monomer the graft modifying agent is maleic anhydride and the polycarbonate is bisphenol-A polycarbonate.

10. The composition prepared from the process of claim 1.

11. The composition prepared from the process of claim 9.

12. A composition comprising an admixture of an amorphous polyester selected from the group consisting of an aromatic polycarbonate, aromatic copolyestercarbonate, polyarylate and polycycloalkylene phthalate with a melt of a graft modified polystyrene polymer which is not a block copolymer, wherein the graft modifying agent is an unsaturated dicarboxylic acid or an unsaturated dicarboxylic acid anhydride.

13. A composition in accordance with claim 12 wherein polycarbonate is present.

14. A composition in accordance with claim 12 wherein the monomer in the polystyrene polymer is styrene, α-methylstyrene or p-methylstyrene.

15. A composition in accordance with claim 14 wherein a non-styrenic comonomer is present.

16. A composition in accordance with claim 15 wherein the styrenic monomer is 20–90 mole percent of the polystyrene.

17. A composition in accordance with claim 16 wherein the non-styrenic monomer is acrylonitrile, methacrylate or an alkadiene.

18. A composition in accordance with claim 17 wherein the styrenic monomer is more than or equal to 50 mole percent.

19. A composition in accordance with claim 12 wherein the graft modifying agent is fumaric acid or maleic anhydride.

20. A composition in accordance with claim 13 wherein the polystyrene polymer is made from styrene monomer, the graft modifying agent is maleic anhydride and the polycarbonate is bisphenol-A polycarbonate.

* * * * *